United States Patent [19]

Schmedtkord et al.

[11] 3,883,262

[45] May 13, 1975

[54] LUBRICANT PUMP FOR SEWING MACHINES

[75] Inventors: Ultich Schmedtkord; Roland Franz Saile, both of Karlsruhe; Reinhold Papajewski, Buchig, all of Germany

[73] Assignee: The Singer Company, New York, N.Y.

[22] Filed: Oct. 1, 1973

[21] Appl. No.: 402,515

[52] U.S. Cl. ............... 415/90; 184/6.15; 112/256
[51] Int. Cl. ..................... F03b 5/00; D05b 71/00
[58] Field of Search ......... 415/90; 184/6.15, 31, 34, 184/35; 112/256

[56] References Cited
UNITED STATES PATENTS

| | | | |
|---|---|---|---|
| 2,837,173 | 6/1958 | Ciecior | 112/256 X |
| 3,037,457 | 6/1962 | Sternlicht | 415/90 |
| 3,084,648 | 4/1963 | Ketterer | 415/90 |
| 3,669,561 | 6/1972 | Mott | 415/90 |
| 3,733,144 | 5/1973 | Gardner | 415/90 |

FOREIGN PATENTS OR APPLICATIONS 991,955 5/1965 United Kingdom............... 184/6.15
1,048,283 1/1959 Germany ........................... 415/90

*Primary Examiner*—Manuel A. Antonakas
*Attorney, Agent, or Firm*—Robert E. Smith; Marshall J. Breen; Chester A. Williams, Jr.

[57] ABSTRACT

A lubricant pump is provided comprising a plain cylindrical driveshaft on which is arranged a shaft collar formed with a plain cylindrical bore embracing the driveshaft. A spring is attached to the collar and extends to an anchor point on the sewing machine frame to bias the collar against the driveshaft. The spring displaces the collar arranging the collar bore eccentrically with respect to the driveshaft. An oil inlet port is formed in the collar leading to a point on the collar bore which is urged away from the driveshaft by the spring, and a lubricant outlet bore is formed in the bushing leading to the point on the bushing bore which is closest to the surface of the driveshaft in response to the pressure of the spring.

1 Claim, 3 Drawing Figures

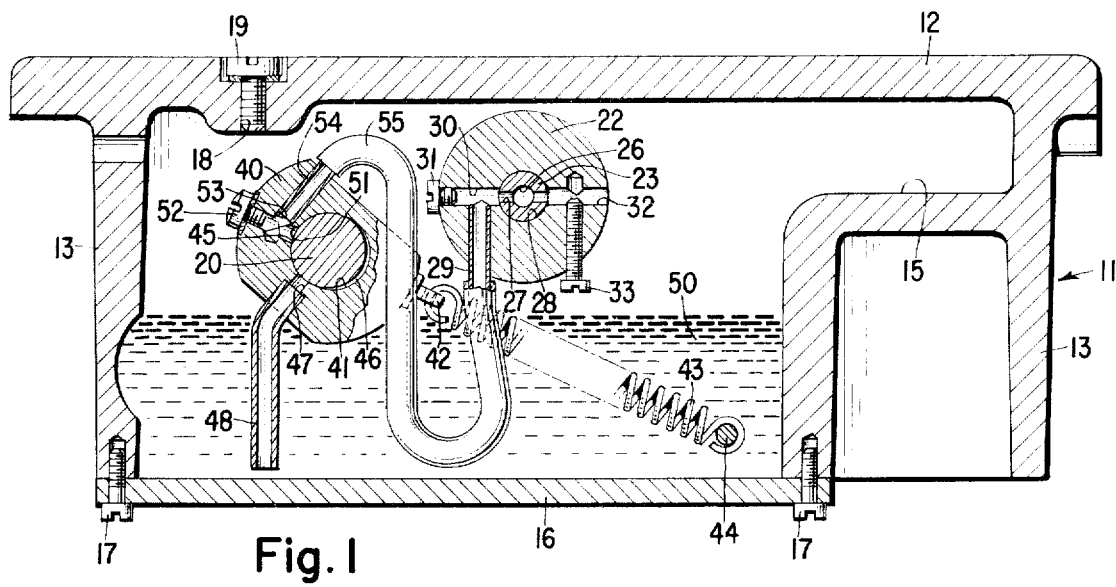
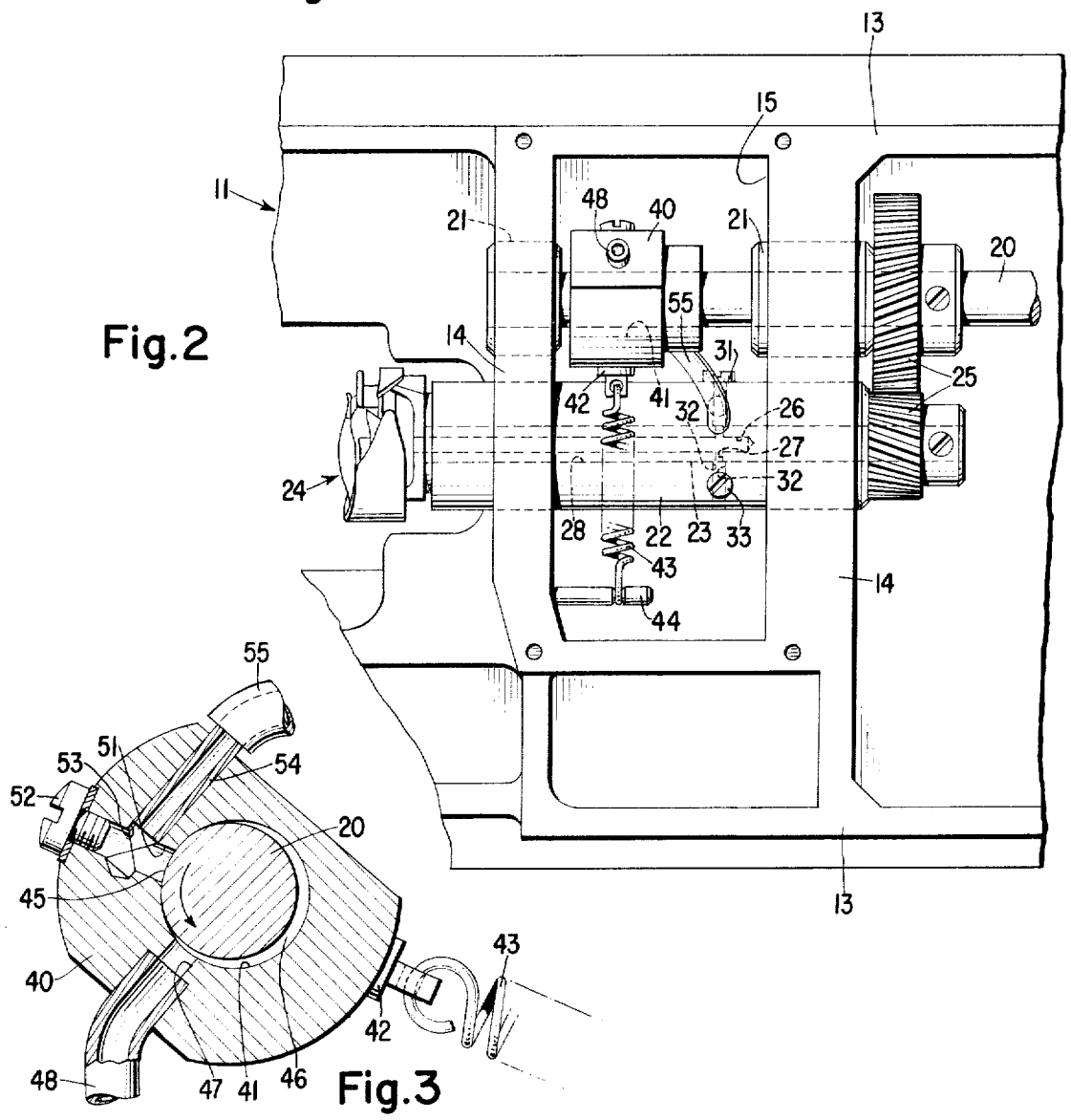

LUBRICANT PUMP FOR SEWING MACHINES

BACKGROUND OF THE INVENTION

It has long been known that the basis of operation of sleeve bearings relies on the creation of a hydrodynamic wedge of lubricant between the sleeve bearing and the shaft. The pressure which exists in this lubricant wedge varies inversely in proportion to the thickness of the lubricant wedge, and therefore in a sleeve bearing, the point at which the bearing load will force the driveshaft closest to the sleeve bearing bore will automatically develop the highest lubricant pressure with which to offset and support the bearing load.

A sleeve bearing which is provided for support of a rotary shaft is not particularly well suited for use as a lubricant pump in accordance with the present invention because the location of the hydro-dynamic lubricant wedge will vary depending upon load conditions on the shaft and depending upon such factors as shaft speed and the like, and therefore, problems will be encountered in locating the position for the lubricant inlet and outlet ports in a support bearing.

In those instances in which the principle of the hydrodynamic lubricant wedge formation in a sleeve bushing about a rotary shaft have been utilzed for lubricant pump means, as for instance disclosed in the U.S. Pat. No. 3,037,457, June 5, 1972, B. Sternlicht and U.S. Pat. No. 3,669,561, June 13, 1972, R. C. Mott, special non-circular shapes for the sleeve bore or special eccentric arrangements of the sleeve bores have been required. As a result, therefore, prior lubricant pumping devices employing the hydro-dynamic principle have involved very costly machining operations and very complicated and demanding constructions and assemblies which have minimized the effectiveness and practicality of these prior pump devices.

SUMMARY OF THE INVENTION

It is an object of this invention to provide a lubricant pumping device for a sewing machine which may be applied to any driven shaft of the sewing machine without modification of the shaft utilizing only a plain sleeve formed with a plain cylindrical bore embracing the shaft into which sleeve the lubricant inlet and a lubricant outlet ports have been formed. This object is obtained by the provision of a spring which is attached to the shaft sleeve and serves to bias the sleeve in a predetermined position against the rotating shaft thus to locate accurately and simply the position at which the sleeve bore is disposed closest to the shaft which it embraces. By this expedient, the position of the hydrodynamic lubricant wedge which will be formed therebetween will be located accurately and the position so located will not vary with machine operating conditions.

DESCRIPTION OF THE DRAWINGS

In the accompanying drawings of a preferred embodiment of this invention:

FIG. 1 represents a cross sectional view of a conventional sewing machine bed illustrating the lubricant pump of this invention applied thereto;

FIG. 2 is a bottom plan view of a portion of the sewing machine bed of FIG. 1 with the bottom cover of the lubricant reservoir removed illustrating the lubricant pump device applied thereto; and FIG. 3 is an enlarged cross sectional view of the lubricant pumping device of this invention.

DETAILED DESCRIPTION OF THE INVENTION

Indicated generally at 11 in FIGS. 1 and 2 is the bed portion of a sewing machine frame which is formed with a work supporting top plate 12 from which side walls 13 depend. Transverse webs 14 extending from the side walls 13 cooperate to define an oil reservoir compartment 15 within the bed which is closed by a bottom cover 16 secured in place by fastening screws 17. A lubricant filler hole 18 formed through the work supporting top is closed by a cap screw 19.

Journaled for turning movement beneath the work supporting top of the sewing machine bed is a bed shaft 20 which may be supported for rotation in bushings 21 carried in the transverse webs 14. Also secured in the transverse webs 14 is a bushing 22 within which a loop taker shaft 23 is journaled. Preferably, the loop taker shaft is arranged parallel to the bed shaft 20 and carries outside the oil reservoir compartment 15 a conventional stitch forming loop taker 24. The loop taker shaft is driven from the bed shaft by meshing gears 25 and for lubrication of the loop taker, the loop taker shaft 23 is formed with an axial bore 26 with communicates, as is well known in the art, with the bearing surfaces within the loop taker 24.

While the lubricant pump of this invention will be advantageous in its use with any known arrangement for introducing lubricant under pressure to the loop taker bearings or to any other portion of the sewing machine requiring pressure lubrication, the arrangement illustrated in the drawings whereby lubricant under pressure may be introduced to the loop taker bearing surfaces includes a radial port 27 formed in the loop taker shaft from the axial bore 26 to the bearing surface 28 between the loop taker shaft and the bushing 22. A hose connection 29 is fitted into the bushing 22 and is arranged to open onto a lubricant introduction port 30 which is formed in the bushing 22 leading to the bearing surface 28. A plug 31 may be utilized to prevent escape of lubricant from the introduction port. An exhaust port 32 is formed in the bushing 22 leading from the bearing surface 28 to the exterior of the bushing, and a metering screw 33 may be threaded in the bushing 22 to provide for an adjustable escape path for the lubricant which is delivered under pressure to the loop taker shaft bushing 22.

The lubricant pumping device of this invention for supplying lubricant under pressure to the loop taker lubricating hose connection 29 will now be described. A collar 40 formed with a plain cylindrical bore 41 slightly larger in diameter than the external diameter of the bed shaft 20 is arranged freely on the bed shaft 20 within the oil reservoir compartment 15. A lug 42 is formed exteriorally on the collar 40 and accommodates one extremity of the spring 43 which is stretched across the oil reservoir compartment and anchored on a pin 44 which is set into one of the transverse webs 14. The spring 43 biases the collar toward the anchor pin 44 and establishes the closest line of convergence 45 of the collar bore 41 with the bed shaft 20 as is best shown in FIG. 3; and by the same token establishes the point 46 at which the collar bore 41 is spaced a maximum distance from the bed shaft 20. An inlet port 47 is drilled through the collar leading to a point near the point of maximum space 46 between the bore 41 and the bed shaft 20. An inlet tube 48 is connected to the inlet port and directed into an oil supply 50 in the oil reservoir compartment 15. An outlet port 51 is drilled through the collar 40 and is directed to the line 45 of closest convergence between the collor bore 41 and bed shaft 20. A plug 52 may be used to seal the outer extremity of the outlet port 51 and a transverse port 53 is provided intersecting the outlet port 51 into which transverse port a hose connector 54 is fitted. A hose 55 serves to interconnect the hose connector 54 on the collar 40 with the hose connector 29 on the loop taker shaft bushing 22.

The location for the pump outlet port 51 should always be arranged at the line 45 of closest convergence between the driveshaft and the collar bore. The location of the inlet port 47 may be located at or near the point of maximum spacing between the collar bore 41 and the bed shaft, or as shown in the drawings it may be located substantially 90° beyond the line 45 of closest convergence in the direction toward which the bed shaft rotates as indicated by the curved arrow in FIG. 3. The lubricant which exists in the space between the collar bore and the bed shaft will be subjected to increasing pressure as the space between the collar bore and the shaft diminishes toward the line of closest convergence therebetween. Beyond that line 45 as the wedged shaped space between these parts increases, a reduction of the pressure will occur, and by locating the inlet port 47 as shown in FIG. 3 a negative pressure area will be experienced which will draw a fresh supply of lubricant into the space between those parts.

Tests using the lubricant pump of this invention have shown that with a spring force of 2.5 pounds acting on the collar 40 and a bed shaft speed of 1,000 rpm, pressures at the pump outlet in excess of 45 pounds per square inch may be attained. The volume metric capacity of the lubricant pump of this invention has been found to be sufficient for lubrication requirements of sewing machine parts; for instance, with a spring force of 2.5 pounds acting on the collar 40 and at a bed shaft speed of 2,000 rpm the pump can deliver to a reservoir located vertically 2 feet above the oil pump 3 cubic inches in 40 minutes. A spring force of approximately 3.5 pounds applied to the collar 40 will increase the output characteristics of the pump and has been found to be a preferred spring value.

The advantage of the lubricant pump of this invention resides in its simplicity of construction. The collar 40 with the plain cylindrical bore 41 and the lubricant inlet and outlet ports requires no special machining nor are exceedingly high tolerances required. The pump may be situated on any plain shaft within the sewing machine and the shaft may need not have any special machining nor any special construction to accommodate this pump since the point of highest pressure within the pump may be accurately located and determined by the spring and since this point of maximum pressure will not be influenced by shaft loading or shaft speed or the like the pump output may be depended upon to be consistent and adequate for sewing machine lubrication needs.

Having thus set forth the nature of the invention, what is claimed herein is:

1. A lubricant pump for a sewing machine including a rotary actuating shaft with a smooth cylindrical exterior portion, said pump comprising a shaft collar formed with a plain cylindrical bore accommodated with clearance on said smooth cylindrical exterior portion of said rotary actuating shaft, spring means biasing said collar in one direction transversely of said actuating shaft to define a line of closest convergence of said collar bore with said rotating shaft exterior, a lubricant outlet port formed in said collar leading from said line of closest convergence of said collar bore with said smooth cylindrical exterior portion of said rotating shaft exterior, and a lubricant inlet port formed on said collar and leading to said collar bore in angularly spaced relation from said outlet port.

* * * * *